UNITED STATES PATENT OFFICE.

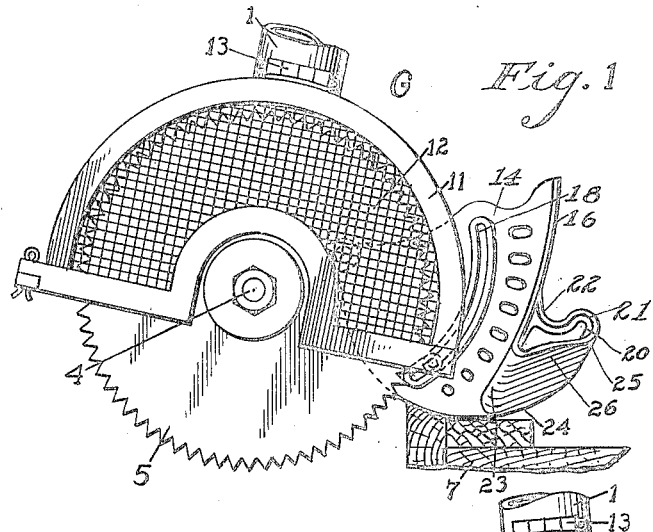
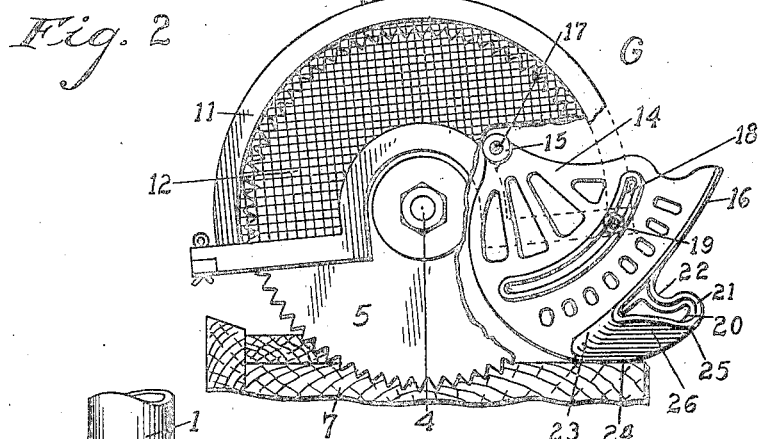
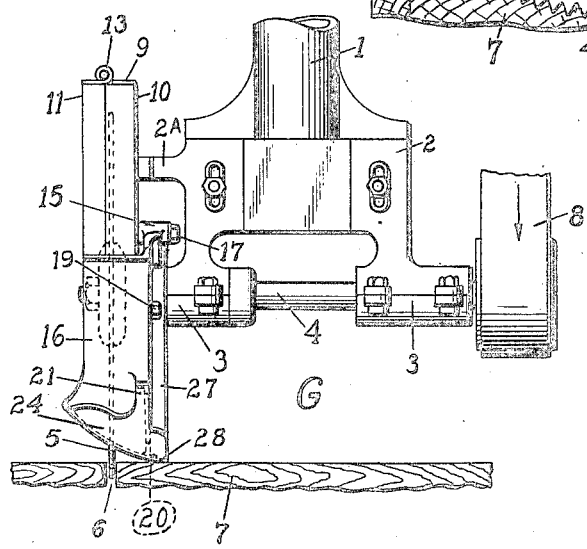

ANDREW F. HOWE, OF GRANITE CITY, ILLINOIS, ASSIGNOR, BY MESNE ASSIGNMENTS, TO HOWE SAFETY APPLIANCE COMPANY, OF GRANITE CITY, ILLINOIS, A CORPORATION OF ILLINOIS.

SAFETY-GUARD FOR SWING-SAWS.

1,375,698.     Specification of Letters Patent.     Patented Apr. 26, 1921.

Application filed July 19, 1918. Serial No. 245,750.

*To all whom it may concern:*

Be it known that I, ANDREW F. HOWE, a citizen of the United States, residing at Granite City, county of Madison, and State of Illinois, have invented a certain new and useful Improvement in Safety-Guards for Swing-Saws, of which the following is a specification, reference being had to the accompanying drawing, forming a part thereof.

This invention relates generally to safety devices and, more particularly, to a certain new and useful improvement in safety-guards for swing-saws, the chief object of my present invention being to provide a simple, inexpensive, and efficient guard operable, especially during the use of the saw, as a protection from injury to an operator working at or adjacent the front of the saw.

With the above and other objects in view, my invention resides in the novel features of form, construction, arrangement, and combination of parts hereinafter described and afterward pointed out in the claims.

In the accompanying drawing,—

Figure 1 is a fragmental side elevational view of a swing-saw equipped with a safety-guard embodying my invention, the saw being illustrated at approximately the limit of its backward stroke;

Fig. 2 is a similar view with the saw and its hood broken away and the saw illustrated at approximately the limit of its forward stroke; and Fig. 3 is a front elevational view of the saw-parts and the guard.

Referring more particularly to the said drawing, in which like reference characters refer to like parts throughout the several views, I have shown my new safety-guard in connection with a swing saw of standard type or construction. Of this construction, 1 is a fragment of the usual hanger-bar, which, in practice but not here shown, is suitably supported at its upper end to pivotally swing or oscillate, 2 is the saw-supporting frame having bearings 3 for the rotary saw-shaft 4, and 5 is the rotary or circular saw, which is fixed upon shaft 4 to work in a slot or kerf 6 of a table 7, the shaft 4 being connected by a belt or the like 8 to a suitable source of driving power.

Fixed to an extension 2ª of the frame 2 and inclosing the saw 5 as shown, is a safety-hood approximately semi-circular in shape in side elevation, this hood comprising a rim 9, a back-plate 10, and a front-plate 11, front-plate 11 having preferably an open mesh or screen body-portion 12 and being hinged, as at 13, to rim 9, so that ready access may be conveniently had within the hood for changing of saws. This hood provides normally, as when the saw is at rest, a sufficient operator's safety-guard, but with the employment of the hood only a large part of the saw is exposed to the possible injury of the operator when the saw is in use and especially when the saw is at the limit of its forward stroke. As an additional or auxiliary safety-guard to completely and efficiently protect the operator from injury, I provide my new safety-guard G, which is preferably an integral casting of aluminum or other suitable strong and rigid, but light-weight metallic material.

This casting comprises a body-portion or plate 14 somewhat segmental in shape in side elevation, as shown, and more or less of skeleton form, to reduce weight and material. At its axis, plate 14 is formed with a hub or bearing 15, and at and along its peripheral margin with a lateral flange 16 preferably of somewhat extended width. With plate 14 disposed flatwise relatively to hood back-plate 10 and with the flange 16 projecting transversely in front of the saw 5 and its teeth, as seen especially in Fig. 3, the guard G is swingably mounted at its hub 15 upon a stub-shaft 17 suitably located upon, and projecting laterally from, hood back-plate 10, as shown, whereby the guard G as a whole is not only swingable with the saw in its oscillations, but is also swingably or pivotally movable eccentrically relatively to the axis of the saw, for purposes shortly appearing. Seated also in hood back-wall 10, but with its shank disposed in an arcuate slot 18 formed in plate 14, is a headed pin 19 adapted not only to serve as a guide for the guard G in its swinging movements relatively to the saw, but also to hold the guard from sidewise movement relatively to the saw.

At its rear edge, plate 14 has preferably the rounded or arcual contour shown and is integrally formed with a curved extension-strip 20, which projects approximately in the plane of the plate 14 forwardly beneath, and to a point approximately midway the circumferential length of, flange 16, strip 20 then at its forward extremity being rounded upwardly and backwardly, as at 21, and continued, as at 22, to the under face of the flange 16, as seen in Figs. 1 and 2. At its rear marginal portion, the flange 16 merges in a greatly rounded curve, as at 23, into a wall 24 having the peculiar formation or contour illustrated. This wall 24 extends downwardly and obliquely inwardly and forwardly relatively to the plate 14 and its flange 16, and at its inner edge or margin is arcuated or curved to conform to the lengthwise curvature of the strip 20, into which strip 20 the wall 24 merges in a gently rounded curve, as at 25. At and adjacent its forward edge, the wall 24 is somewhat flattened, as at 26, to present a smooth oblique outer face. The strip 20 with its rounded forward end portion 21 forms with the wall 24 what might be described as a nose for the guard.

At its rear marginal edge and on its face opposite the flange 16, plate 14 is formed with an arcuated or curved laterally disposed strengthening web or flange 27, which flange is continued forwardly along a part of the circumferential length of strip 20 and formed with a transversely curved or rounded outer face, as at 28, to conform to, and provide substantially a continuation of, the curved face of the so-called inner or marginal portion of the nose-wall 24, as seen in Fig. 3.

In use, the guard G projects, as shown, in front of the saw and its inclosing hood and, under the pull of gravity, rides smoothly, at the rounded edge or base 25 of its nose, upon the table 7 throughout the oscillations of the saw, the flange 16 of the guard being at all times disposed transversely across and in front of the saw. The operator is thereby, throughout the operations of the saw, and especially when the saw is traveling forwardly, prevented from contacting with the saw-teeth and thus most efficiently protected from injury. At the same time, and while so protecting the operator, the guard offers no obstacle to the proper placement of a plank or board to be cut. On the placement either lengthwise or edgewise of a plank or board to be cut, the plank or board first encounters, respectively, either the smooth glancing surface presented by the rounded forward nose-end 21 or the smooth glancing surface presented by the obliquely rounded nose-wall 24, the guard as a whole readily yielding upwardly to accommodate the plank or board as the plank or board is directed therebeneath. The guard thus works hand-in-hand with the saw throughout its operations, is "foolproof," is conveniently attachable in connection with the saw, and is simple, inexpensive, and durable in form and construction.

I am aware that minor changes in the form, construction, arrangement, and combination of the several parts of my new safety-guard may be made and substituted for those herein shown and described without departing from the nature and principle of my invention.

Having thus described my invention, what I claim and desire to secure my Letters Patent is:

1. An auxiliary safety-guard for oscillatory rotary-saws comprising integrally a segmental plate, an arcuate flange presented laterally from the peripheral margin of the plate and adapted to extend in spaced relation transversely across the teeth of the saw, and a riding-nose projecting forwardly beneath the flange, the nose having an elongated arcuate under face and rounded end and oblique side faces for the purposes specified.

2. The combination with an oscillatory rotary-saw, of a safety-guard mounted pivotally upon the saw to swing in the oscillations of the saw both with and relatively to the saw, the guard including a body-plate disposed flatwise relatively to the saw, an arcuate flange projecting laterally from the body-plate and disposed in spaced relation transversely across teeth of the saw, and a nose projecting from the body-plate forwardly beneath the flange, the nose having an elongated arcuate under face and rounded end and oblique side faces for the purposes specified.

In testimony whereof I have signed my name to this specification.

ANDREW F. HOWE.